Figures 1, 2:
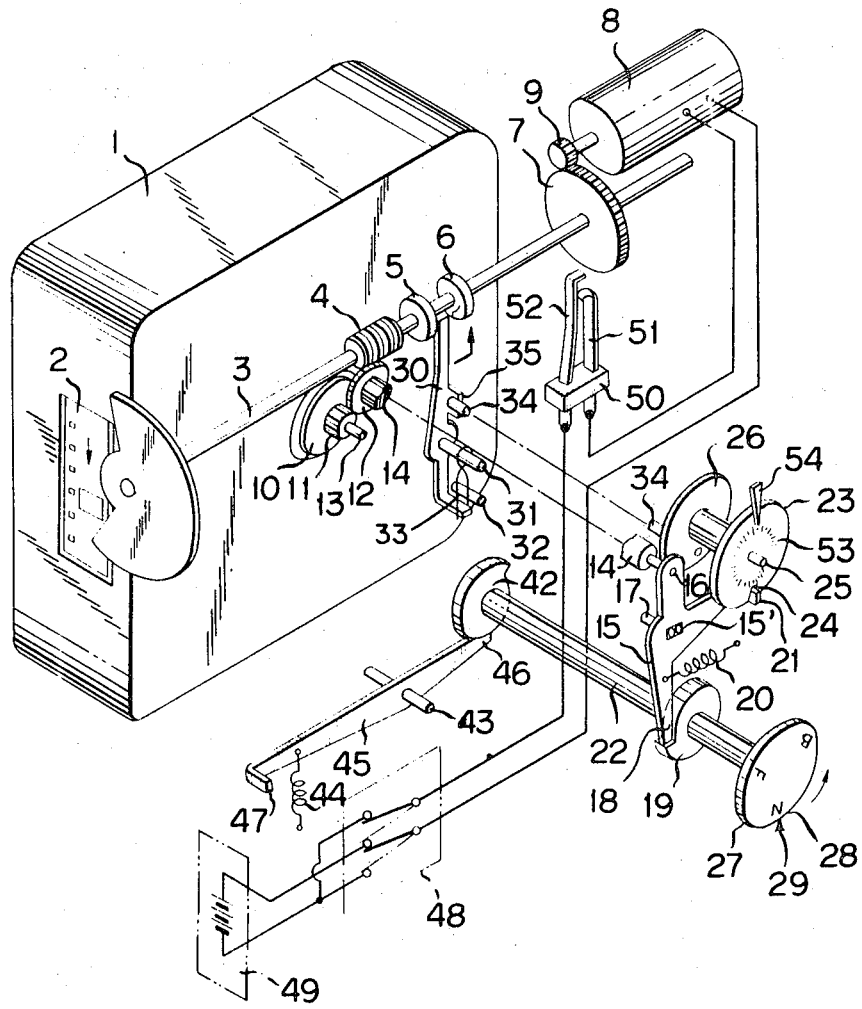

United States Patent

[11] 3,559,911

[72] Inventor Yoshihisa Katsuyama
 Yokohama-shi, Japan
[21] Appl. No. 800,613
[22] Filed Feb. 19, 1969
[45] Patented Feb. 2, 1971
[73] Assignee Nippon Kogaku K.K.
 Tokyo, Japan
 a corporation of Japan
[32] Priority Feb. 23, 1968
[33] Japan
[31] 43-11128

[54] FORWARD-REVERSE RUN AUTOMATIC STOP DEVICE FOR FILM REWIND DEVICE OF MINIATURE MOVIE CAMERA
 2 Claims, 2 Drawing Figs.

[52] U.S. Cl. .................................................... 242/71.5
[51] Int. Cl. ...................................................... G03b 1/06
[50] Field of Search ........................................ 242/71.5, 71.4

[56] References Cited
UNITED STATES PATENTS
2,271,221 1/1942 Drotning et al. ............ 242/71.5
2,398,133 4/1946 Cronholm .................... 242/71.5

Primary Examiner—Nathan L. Mintz
Attorney—Harry G. Shapiro

ABSTRACT: The present invention presents a device for enabling the film rewinding in a miniature movie camera using a film cartridge having no feed spool operable from outside the camera. According to this invention, when the film in forward run is stopped midway by freeing the release operation of the shutter button before the forward run automatic stopping device works and reverse operation is made successively, these operations can be performed without any trouble. An accident caused by erroneous operation is prevented and at the same time, the amount of film loosely stored in the film cartridge can be measured.

PATENTED FEB 2 1971 3,559,911

INVENTOR.
YOSHIHISA KATSUYAMA

BY
Harry G. Shapiro
ATTORNEY 3,559,911

FORWARD-REVERSE RUN AUTOMATIC STOP DEVICE FOR FILM REWIND DEVICE OF MINIATURE MOVIE CAMERA

This invention relates to a film rewinding device and more particularly to a forward and reverse run automatic stopping device for a miniature movie camera using a film cartridge having no feed spool shaft capable of being operated from outside of the camera.

Until now, although devices capable of rewinding in a miniature movie camera using a film cartridge having no feed spool shaft operable from outside have been proposed, they are far from reliable in their operation and have many disadvantages in their use. There has been a demand for a device of improved reliability.

An object of this invention is to overcome the inconvenience that the film is left loose in the film cartridge and enters normal picture taking accidentally with the provision particularly of a clutch restricting member to a footage counter.

Furthermore, according to the present invention, the footage stopper is provided in such a manner as to increase the amount of work given by the footage counter for rapidly and correctly engaging the footage stopper with the footage stopper claw, and for completely avoiding the accidental biting that may be cause by the footage stop claw as it moves away from the footage stopper by providing a push cam to the footage stop claw.

In accordance with the present invention, film rewind is possible in a miniature movie camera that uses film cartridge having no feed spool operable from outside the camera. Moreover, when the film in forward run is stopped midway by freezing the release operation of the shutter button before the forward run automatic stopping device works and reverse operation is made in succession, the operation that follows can be performed without any trouble. Accidents caused when the film has been left loose and stored in the takeup side and successive normal picture-taking operations are made are prevented. Both forward run and reverse run are started immediately without causing biting, etc. Furthermore, when reverse operation is carried out without storing film the film is automatically stopped in an instant. This prevents the occurence of accidents caused by erroneous operation and at the same time indicates the amount of film stored loose in the film cartridge. In short this invention is very useful in practical applications.

This invention will be described to the illustrative embodiment shown in the attached drawings, in which:

FIG. 1 is a perspective view of the main portion of an embodiment according to this invention; and FIG. 2 is a plan of footage stop claw disc portion shown in FIG. 1 viewed from the bottom.

Referring to FIG. 1, 1 is a well-known film cartridge that has no rewind feed spool shaft; 2 is a film exposed at the opening of the said film cartridge 1 and fed in the direction of the arrow in normal picture taking; 3 is a rotary shaft which is interlocked with well-known shutter device and film feed claw (not shown in the drawing) and which operates in both forward and reverse directions, on which a counterclockwise wind worm 4, a pair of footage stop claw discs 5 and 6, and a shutter gear 7 are fixed; 8 is a micromotor so constructed as to drive the rotary shaft 3 in both forward and reverse directions by a circuit changeover switch 48 through a small gear 9 mounted on the output shaft and the shutter gear 7; 10 is a film takeup disc which fits with the takeup shaft (not shown in the drawing) embedded in the cartridge 1 and is pivoted on the camera body by shaft 13 in such a manner as to be rotated clockwise by a thin and flat idler gear 12 which also operates as a worm wheel. Fixed to the shaft 13 is driven gear 11 for meshing engagement with the idler gear 12. The idler gear 12 is pivoted rotation free by the shaft 16 provided on the clutch lever 15 together with the gear 14 combined in one unit within to be meshed with the counterclockwise wind worm 4. The clutch lever 15 is held by the pin 17 which is fixed to the camera body and fits to the square hole 15' there of the clutch cam 19 which contacts with its vertical end 18, and the tension spring tension spring 20, and is so constructed that its horizontal end bent portion 21 falls in the V notch 24 of a counterdisc 23. The counterdisc 23 is pivoted by the shaft 25 on the camera body, rotation free, together with the countergear 26 which is formed into one within. The clutch cam 19 is installed rotatable by the shaft 22 combined into one with the control knob 27 which can be operated by hand from outside of the camera; 28 is an indication for example N, symbol inscribed at a predetermined position on the said knob 27, and 29 is the index marked on the camera body. They are formed to displace the clutch lever 15 selectively so that the driven gear 11 meshes with the idler gear 12 when the said indication symbol N is aligned to the index 29 and that the gear 14 and the countergear 26 mesh with each other when the symbols F and B are aligned to the index. The diameter of the outer edge of the said counterdisc 23 is determined so that the horizontal bent portion 21 disengages from the V notch 24 and the edge is enabled to rotate close to the opposite portion of the said bent portion 21 when the clutch lever 15 has been displaced to a position where the gear 14 and the countergear 26 mesh with each other. Scale marks 53 are engraved on the surface of the counterdisc, and the amount of rotation can be read from outside by the index 54 on the camera body. A footage stopper 30, which is supported by the shaft 31 on the camera body, free to rotate, and restricted at the lower end and held by spring force or energized to vertical position by the pin 32 provided on the camera body, and snap spring 33, and the upper end portion of the footage stopper is positioned between the stop claw discs 5 and 6. A vertical bent portion 35 is formed at a position that corresponds to the pin 34 provided on the countergear 26. The stop claw discs will be described in detail referring to FIG. 2. On the stop claw discs 5 and 6 are formed pawls 40 and 41 respectively, having colliding surfaces, 36 and 37, and push cams 38 and 39. These two stop claws discs 5 and 6 are positioned close to the upper end portion of the said footage stopper 30 but not to interfere with it. The angular positions of the colliding surfaces 36 and 37 are determined that the positions at which they collide with the upper portion of the said stopper 30 by the footage automatic stop motion described later is made the same positions as their stop positions caused by the shutter shaft stop claw body which is not illustrated. Again in FIG. 1; 42 is a switch cam formed integral with control knob 27. It is energized by the tension spring 44 so that the tail end 46 of the switch lever 45, which is installed rotation free by the shaft 43 fixed to the camera body, will be pressed against the said switch cam 42. The end portion 47 of the said switch lever 45 is so constructed as to operate the changeover switch 48 which controls the rotating direction of the micromotor 8. The switch cam 42 is so formed as to control the said changeover switch 48 in such a way that the micromotor makes forward run (rotates clockwise facing the output shaft) when the knob 27 is set at N or F and reverse run only when it is set at B. A power supply battery 49 is connected to the micromotor 8 to form a sequential circuit through the changeover switch 48 and release switch springs 51 and 52 which are supported by an electrically nonconductive body 50. Next, the operation of the device according to this invention will be described referring to an example of overlap photography which is actually the superimposition of fade-in and fadeout photography.

In FIG. 1 when the knob is set at N and the contacts of the release switch springs 51 and 52 are closed by operating the shutter button (not shown) from outside the camera body, the forward run circuit is closed and the micromotor 8 rotates clockwise to the output shaft and drives the shaft 3 by way of small gear 9 and shutter gear 7. By the interlocking action of the feed claw (not illustrated, the film 2 is fed to the direction of arrow, and simultaneously, the film takeup disc 10 rotates through the worm 4, idler gear 12 and driven gear 11 so as to takeup the film onto the takeup shaft (not shown) embedded in the film cartridge for effectuating the normal photography.

Next, when the control knob 27 is rotated and set to position F without interrupting the said release operation, the clutch lever 15 is displaced by the clutch cam 19, the driven gear 11 and idler gear 12 are disengaged and the gear 14 is meshed with the countergear 26. Simultaneously, the bent portion 21 is disengaged from the V notch 24 and the countergear 26 is released from locking. Moreover, since the changeover switch 48 is inoperative in this state, picture taking is progressed as before, the rotation of the shaft 3 rotates the countergear 26 instead of film takeup disc 10, and moves forward in the direction which the vertical bent portion 35 departs from the pin 34. Therefore, the film which is fed in the direction of arrow by the film transfer claw (not illustrated) is not taken-up by the takeup shaft in the film cartridge 1 and the amount of film loosely stored in the film cartridge 1 and the amount of film stored is indicated on the scale 53. Since the countergear, after making almost one rotation, presses the footage stopper 30 from outside the vertical bent portion 35 by way of the pin 34, and displaces the end portion of the footage stopper 30 toward the footage stop claw disc 5 against the retaining force of the snap spring 33, rotation of the shaft 3 is automatically stopped and film feed is interrupted, because the colliding surface 36 of the claw body 40 formed on disc 5 shown in FIG. 2 interferes with the said end portion. Since the length of film loosely in the film cartridge during this is a constant value determined by the gear ratios of gear train of worm 4—idler gear 12—gear 14—countergear 26, fade-in operation is carried out by the employment of other appropriate means by which the amount of incident light from the taking lens is reduced continuously corresponding to the said constant value, The contacts 51 and 52 remain closed under the said automatic stop condition but they are immediately opened by the succeeding shutter button release freeing operation and cause no trouble at all.

Next when, after interrupting the incident light from the lens completely, the control knob 27 is rotated and set at position B, the clutch lever 15 remains in the said state, but the changeover switch 48 is switched to reverse run by way of the switch lever 45 by the action of the switch cam 42. If the shutter button is released under this condition, the micromotor 8 rotates reversely and consequently the said each members that is interlocked with the motor moves reversely, and the film that had been stored loosely in the takeup shaft side of the film cartridge 1 is fed in the reverse direction of the arrow by the film feed claw (not illustrated) and returned to the supply side. The countergear 26 is restored to the original position and, by means of the pin 34, presses the footage stopper 30 at the inner side of the vertical bent portion 35, and, resisting against the retaining force of the snap spring 33, displaces the said end portion toward the footage stop claw disc 6 to have it interfere with the colliding surface 37 of the claw body 41 shown in FIG. 2, to impede the rotation of the shaft 3 and make it stop automatically and consequently the film feeding is interrupted. The contacts 51 and 52 under the said stop condition are opened by setting free the release operation of the shutter button similar to the case in which the rotation of the shaft 3 is automatically stopped by the forward movement of the said countergear 26. At the instant when the forward run automatic stop condition, in which the footage stopper 30 is at its end portion made to interfere with the colliding surface 36 of the claw body 40 of the footage stop claw disc 5, is turned to reverse running condition by the said operation, the said end portion is automatically thrown out by the pushout cam 38 of the claw body 40 of the footage stop claw disc 5 shown in FIG. 2. Therefore, the reverse run of the shaft 3 is started steadily without interfering with the said end portion even when there is any play in the countergear 26. Moreover, in either case of forward run automatic stop and reverse run automatic stop, rotation of the shaft 3 can be stopped rapidly and steadily since the footage stopper 30 can be sufficiently engaged with each of the colliding surfaces 36 and 37 because the footage stopper 30 has been so formed and pivoted as to be displaced the end portion thereof larger by the pressure displacement caused by the countergear 26. Then in next step the control knob 27 is rotated and set at position N, since both the clutch lever 15 and the switch lever 45 interlock with each parts to restore them to normal picture taking condition by the action of the clutch cam 19, switch cam 42, and energizing springs 20 and 44, the changeover switch is set at forward run condition, the gear 14 is disengaged from the countergear 26, the driven gear 11 is in mesh with the idle gear 12, the clutch lever 15 is displaced so that the bent portion 21 falls into the V notch 24, and the footage stopper 30 is returned to the original state by the energizing force of the snap spring 33 in which the said end portion does not interfere with either of the claw bodies 40 and 41. Under this condition, if fadeout picture taking is made by doing shutter button release operation with simultaneous employment of some other appropriate means of continuously increasing the amount of incident light from the taking lens, and superimpose it on the image produced by the said fade-in picture taking, the overlap picture taking, or piling of fadeout picture on fade-in picture is completed.

The length of film stored loosely in the takeup side by operating the camera after setting the control knob 27 at position F and the length of film returned to the supply side by operating the camera after setting the said knob at said knob at position B are determined by the angles of rotation of the countergear 26. Since the angles of rotation are always equal because the rotation is a reciprocal motion, the difference in the lengths of the said film can be considered zero if the back lash of interlocking parts are ignored. Since the length of film to be returned to the supply side is determined by means having no relationship to the length of film stored loosely in the takeup side, if the forward run is stopped midway to the automatic stop by freeing shutter button release operation and if the succeeding reverse run operation is carried out, the succeeding operation can be performed without causing any difference in the motion. When the control knob 27 is rotated and set at position N without doing reverse run operation at position B under the said midway stopping condition, the clutch lever 15 is caught and stopped by the outer edge of the counterdisc 23 at the said horizontal bent portion 21, and the engagement of the gear 14 and the countergear 26 is held in retaining condition. Therefore, the motion that stores the film loose in the takeup side is continued until and automatic stop even when the shutter button is released. Therefore, to continue succeeding operation is impossible until the said rewind operation is repeated and finished. Consequently, when the film is left loose and stored in the takeup side, no accident is caused by the transfer to normal picture taking operation. Moreover, since the pushout cam 39 is formed on the claw body 41 of the footage stop claw disc 6, if the control knob 27 is rotated from position B to position N and set there without setting free the shutter button release operation under reverse run automatic stop condition, the forward run of the shaft 3 is immediately started because the footage stopper 30 is thrown out steadily by the pushout operation of the said pushout cam 39.

In case the control knob 27 is rotated and set at position B and released without doing film storing operation in cartridge 1, the pin 34 immediately works to press the inside of the vertical bent portion 35 and the reverse motion are stopped instantly.

Therefore, no trouble is caused by the said operation.

I claim: 6

1. A forward-reverse run automatic stop device for a film rewinding device of a miniature movie camera comprising two stop claw discs having pushout cams fixed face-to-face together with a worm on a shaft interlockable with a shutter device; a driven gear having a film takeup disc for driving a film take up shaft and a countergear having a pin provided eccentrically to a supporting shaft by a predetermined amount rotatably mounted on the camera body, respectively, with a predetermined space therebetween; an idler gear operable as a worm wheel meshing with said worm intermediate said driven gear and countergear; a clutch lever rockably mounted on the camera body for selective engagement with the driven gear and the countergear, and the clutch lever having a bent portion, a counter disc having a notch to receive said bent portion, the idler gear being supported by the clutch lever; the counterdisc being unitary with the countergear and the outer diameter of the counterdisc being determined so that the bent portion of the clutch lever contacts the outer edge of the counterdisc when the idler gear is in a state of meshing with the countergear; a footage stopper pivotably supported on the camera body for swing motion and normally maintained in vertical state by having its lower end portion restricted by a pin provided on the camera body and a snap spring, the upper end portion of the stopper being positioned between said stop claw discs and a vertical bent portion thereof being intermittently contactable by a pin secured to said countergear 2. A forward-reverse run automatic stop device for a film rewinding device of a miniature movie camera according to claim 1, the device further comprising a predetermined divisional footage scale indices engraved on the counterdisc and a corresponding index mark is fixed to the camera, the footage scale and the index mark forming a footage counter which indicates the amount of film stored loosely in the film cartridge.